United States Patent [19]

Hilbig

[11] 4,455,003
[45] Jun. 19, 1984

[54] SUPERCRITICAL AIR-FOIL PROFILE

[75] Inventor: Reinhard Hilbig, Delmenorst, Fed. Rep. of Germany

[73] Assignee: VFW, Bremen, Fed. Rep. of Germany

[21] Appl. No.: 888,319

[22] Filed: Mar. 20, 1978

[30] Foreign Application Priority Data

Mar. 23, 1977 [DE] Fed. Rep. of Germany ....... 2712717

[51] Int. Cl.³ .............................................. B64C 3/14
[52] U.S. Cl. ................................................. 244/35 R
[58] Field of Search ................... 244/35 R, 35 A, 123, 244/34 R

[56] References Cited

U.S. PATENT DOCUMENTS 3,952,971 4/1976 Whitcomb ........................ 244/35 R
4,072,282 2/1978 Fulker et al. ..................... 244/35 R

OTHER PUBLICATIONS

Boerstoel, "Sym. Subsonic Potential Flows Around Quasi-Elliptical Aerofoil Sections," NLR TR 68016V, Mar., 1968.

Kacprzynski et al., "Wind Tunnel Tests of a Shockless Lifting Airfoil," No. 1, NAE Report #5×5/0054, Aug., 1971.

Arlinger, "An Exact Method of Two-Dimensional Airfoil Design," SAAB Technical Notes, SAAB TN 67, Oct., 1970.

*Primary Examiner*—Galen L. Barefoot
*Attorney, Agent, or Firm*—Ralf H. Siegemund

[57] ABSTRACT

The supercritical profile has an upper surface whose curvature has two minima, one in front of the mid-chord station, the other one rather close to the trailing edge and having a lower value than the first one. The curvature of the lower surface remains larger beyond the mid-chord station, changes sign and increases to a pronounced maximum not far from the second curvature minimum of the upper surface, and drops to zero at the trailing edge.

2 Claims, 19 Drawing Figures

| GEOMTRIC PARAMETER | |
|---|---|
| MAX. THICKNESS | $z_D/l = 0.13$ |
| THICKNESS RATIO $z/l_{m_o}/z/l_{m_u}$ | $=1.04657$ |
| DEPTH OF UPPER SURFACE MAX. THICKNESS | $(x/l)_{m_o} = 0.42$ |
| DEPTH OF LOWER SURFACE MAX. THICKNESS | $(x/l)_{m_u} = 0.3$ |
| TRAILING EDGE THICKNESS | $z_h/l = 0.00522$ |
| TRAILING EDGE ANGLE | $6°$ |

Fig. 18    table 1

| x (mm) | $z_0$ (mm) | x (mm) | $z_0$ (mm) | x (mm) | $z_0$ (mm) |
|---|---|---|---|---|---|
| .00000 | .00000 | 19.76000 | 9.08052 | 123.97036 | 11.83966 |
| .08000 | .87009 | 20.48000 | 9.19501 | 125.96844 | 11.68727 |
| .16000 | 1.17772 | 21.20000 | 9.30600 | 127.96592 | 11.52632 |
| .24000 | 1.41029 | 22.36160 | 9.48374 | 129.96340 | 11.35680 |
| .32000 | 1.60310 | 23.52320 | 9.65551 | 131.96028 | 11.17826 |
| .40000 | 1.77000 | 24.68480 | 9.82134 | 133.95716 | 10.99114 |
| .48000 | 1.91408 | 25.84640 | 9.98123 | 135.95404 | 10.79543 |
| .56000 | 2.04636 | 27.00800 | 10.13520 | 137.95092 | 10.59112 |
| .64000 | 2.16889 | 28.60812 | 10.33526 | 139.94780 | 10.37820 |
| .72000 | 2.28307 | 30.20824 | 10.52570 | 141.94404 | 10.15632 |
| .80000 | 2.39000 | 31.80836 | 10.70652 | 143.94028 | 9.92627 |
| .96000 | 2.58858 | 33.40848 | 10.87774 | 145.93652 | 9.68805 |
| 1.12000 | 2.77168 | 35.00830 | 11.03940 | 147.93276 | 9.44163 |
| 1.28000 | 2.94131 | 36.40856 | 11.17531 | 149.92900 | 9.18700 |
| 1.44000 | 3.09900 | 37.80852 | 11.30556 | 151.92548 | 8.92425 |
| 1.60000 | 3.24600 | 39.20848 | 11.43015 | 153.92196 | 8.65410 |
| 1.84000 | 3.45051 | 40.60844 | 11.54910 | 155.91844 | 8.37656 |
| 2.08000 | 3.64157 | 42.00840 | 11.66240 | 157.91492 | 8.09159 |
| 2.32000 | 3.82027 | 43.60832 | 11.78598 | 159.91140 | 7.79920 |
| 2.56000 | 3.98749 | 45.20824 | 11.90355 | 161.50808 | 7.56023 |
| 2.80000 | 4.14400 | 46.80816 | 12.01511 | 163.10476 | 7.31725 |
| 3.84000 | 4.29639 | 48.40808 | 12.12065 | 164.70144 | 7.07026 |
| 3.28000 | 4.44195 | 50.00800 | 12.22020 | 166.29812 | 6.81924 |
| 3.52000 | 4.58092 | 52.00776 | 12.33714 | 167.89480 | 6.56420 |
| 3.76000 | 4.71353 | 54.00752 | 12.44618 | 169.09184 | 6.37091 |
| 4.00000 | 4.84000 | 56.00728 | 12.54734 | 170.28888 | 6.17581 |
| 4.24000 | 4.96082 | 58.00704 | 12.64061 | 171.48592 | 5.97889 |
| 4.48000 | 5.07734 | 60.00680 | 12.72600 | 172.68296 | 5.78015 |
| 4.72000 | 5.18965 | 62.00636 | 12.80477 | 173.88000 | 5.57960 |
| 4.96000 | 5.29785 | 64.00592 | 12.87656 | 175.47548 | 5.31383 |
| 5.20000 | 5.40200 | 66.00548 | 12.94135 | 177.07096 | 5.04343 |
| 5.44000 | 5.50381 | 68.00504 | 12.99917 | 178.66644 | 4.76840 |
| 5.68000 | 5.60288 | 70.00460 | 13.05000 | 180.26192 | 4.48873 |
| 5.92000 | 5.69925 | 72.00400 | 13.09448 | 181.85740 | 4.20440 |
| 6.16000 | 5.79295 | 74.00340 | 13.13236 | 183.08592 | 3.97722 |
| 6.40000 | 5.88400 | 76.00280 | 13.16363 | 184.31444 | 3.74679 |
| 6.72000 | 6.00180 | 78.00220 | 13.18832 | 185.54296 | 3.51312 |
| 7.04000 | 6.11627 | 80.00160 | 13.20640 | 186.77148 | 3.27619 |
| 7.36000 | 6.22743 | 82.00088 | 13.21846 | 188.00000 | 3.03600 |
| 7.68000 | 6.33534 | 84.00016 | 13.22390 | 189.20000 | 2.79988 |
| 8.00000 | 6.44000 | 85.99944 | 13.22270 | 190.40000 | 2.56122 |
| 8.40000 | 6.56779 | 87.99872 | 13.21486 | 191.60000 | 2.32002 |
| 8.80000 | 6.69186 | 89.99800 | 13.20040 | 192.80000 | 2.07629 |
| 9.20000 | 6.81223 | 91.99684 | 13.17933 | 194.00000 | 1.83000 |
| 9.60000 | 6.92894 | 93.99558 | 13.15127 | 194.40000 | 1.74740 |
| 10.00000 | 7.04200 | 95.99452 | 13.11623 | 194.80000 | 1.66450 |
| 10.72000 | 7.23471 | 97.99386 | 13.07421 | 195.20000 | 1.58130 |
| 11.44000 | 7.41899 | 99.99220 | 13.02520 | 195.60000 | 1.49780 |
| 12.16000 | 7.59492 | 101.99072 | 12.96920 | 196.00000 | 1.41400 |
| 12.88000 | 7.76257 | 103.98924 | 12.90568 | 196.40000 | 1.32912 |
| 13.60000 | 7.92200 | 105.98776 | 12.83464 | 196.80000 | 1.24428 |
| 14.40000 | 8.89435 | 107.98628 | 12.75608 | 197.20000 | 1.15948 |
| 15.20000 | 8.25989 | 109.98480 | 12.67000 | 197.60000 | 1.07472 |
| 16.00000 | 8.41865 | 111.98394 | 12.57604 | 198.00000 | .99000 |
| 16.80000 | 8.57068 | 113.98128 | 12.47394 | 198.40000 | .90640 |
| 17.60000 | 8.71600 | 115.97932 | 12.36370 | 198.80000 | .82320 |
| 18.32000 | 8.84103 | 117.97776 | 12.24533 | 199.20000 | .74040 |
| 19.04000 | 8.96253 | 119.97600 | 12.11880 | 199.60000 | .65800 |
|  |  | 121.97348 | 11.98350 | 200.00000 | .57600 |

Fig.19  table 2

| x (mm) | zu (mm) | x (mm) | zu (mm) | x (mm) | zu (mm) |
|---|---|---|---|---|---|
| .00000 | .00000 | 19.76944 | -9.48491 | 123.66380 | -5.76716 |
| .08000 | -.75555 | 20.48792 | -9.60755 | 125.53740 | -5.37487 |
| .16000 | -1.08605 | 21.20640 | -9.72700 | 127.41100 | -4.98223 |
| .24000 | -1.33602 | 22.36644 | -9.91364 | 129.28460 | -4.58920 |
| .32000 | -1.54358 | 23.52648 | -10.09293 | 131.39864 | -4.18368 |
| .40000 | -1.72360 | 24.68652 | -10.26487 | 133.51258 | -3.78734 |
| .48000 | -1.88197 | 25.84656 | -10.42948 | 135.62672 | -3.40016 |
| .56000 | -2.02626 | 27.00650 | -10.58680 | 137.74076 | -3.02212 |
| .64000 | -2.15908 | 28.60656 | -10.79134 | 139.85480 | -2.65320 |
| .72000 | -2.28227 | 30.20652 | -10.98367 | 141.85340 | -2.29282 |
| .80000 | -2.39720 | 31.80648 | -11.16384 | 143.85200 | -1.94482 |
| .96000 | -2.60115 | 33.40644 | -11.33188 | 145.85050 | -1.60915 |
| 1.12000 | -2.78830 | 35.00640 | -11.48780 | 147.84920 | -1.28576 |
| 1.28000 | -2.96109 | 36.40624 | -11.61603 | 149.84780 | -.97460 |
| 1.44000 | -3.12133 | 37.80608 | -11.73615 | 151.85576 | -.68844 |
| 1.60000 | -3.27040 | 39.20592 | -11.84818 | 153.86372 | -.42349 |
| 1.84000 | -3.48566 | 40.60576 | -11.95213 | 155.87168 | -.17965 |
| 2.08000 | -3.68670 | 42.00550 | -12.04800 | 157.87964 | .04316 |
| 2.32000 | -3.87468 | 43.60528 | -12.14829 | 159.88750 | .24500 |
| 2.56000 | -4.05057 | 45.20496 | -12.23895 | 161.49888 | .38730 |
| 2.80000 | -4.21520 | 46.80454 | -12.31998 | 163.11016 | .51391 |
| 3.04000 | -4.36845 | 48.40432 | -12.39139 | 164.72144 | .62488 |
| 3.28000 | -4.51532 | 50.00400 | -12.45320 | 166.33272 | .72024 |
| 3.52000 | -4.65605 | 52.00328 | -12.51772 | 167.94400 | .80000 |
| 3.76000 | -4.79088 | 54.00256 | -12.56819 | 169.15400 | .84722 |
| 4.00000 | -4.92000 | 56.00184 | -12.60463 | 170.36400 | .88583 |
| 4.24000 | -5.05172 | 58.00112 | -12.62703 | 171.57400 | .91582 |
| 4.48000 | -5.17917 | 60.00040 | -12.63540 | 172.78400 | .93721 |
| 4.72000 | -5.30244 | 61.99932 | -12.63071 | 173.99400 | .95000 |
| 4.96000 | -5.42162 | 63.99824 | -12.61239 | 175.60520 | .95545 |
| 5.20000 | -5.53680 | 65.99716 | -12.58044 | 177.21640 | .94678 |
| 5.44000 | -5.64227 | 67.99608 | -12.53484 | 178.82750 | .92399 |
| 5.68000 | -5.74503 | 69.99500 | -12.47560 | 180.43880 | .88706 |
| 5.92000 | -5.84515 | 71.99332 | -12.40324 | 182.05000 | .83600 |
| 6.16000 | -5.94266 | 73.99154 | -12.31707 | 183.24000 | .78904 |
| 6.40000 | -6.03760 | 75.98996 | -12.21708 | 184.43000 | .73477 |
| 6.72000 | -6.16901 | 77.98828 | -12.10327 | 185.62000 | .67318 |
| 7.04000 | -6.29814 | 79.98660 | -11.97560 | 186.81000 | .60426 |
| 7.36000 | -6.42501 | 81.98456 | -11.83369 | 188.00000 | .52800 |
| 7.68000 | -6.54962 | 83.98252 | -11.67762 | 189.20000 | .44277 |
| 8.00000 | -6.67200 | 85.98048 | -11.50736 | 190.40000 | .35127 |
| 8.40000 | -6.81966 | 87.97844 | -11.32290 | 191.60000 | .25347 |
| 8.80000 | -6.96244 | 89.97640 | -11.12420 | 192.80000 | .14939 |
| 9.20000 | -7.10038 | 91.97384 | -10.91005 | 194.00000 | .03900 |
| 9.60000 | -7.23355 | 93.97128 | -10.68202 | 194.40000 | .00180 |
| 10.00000 | -7.36200 | 95.96872 | -10.44005 | 194.80000 | .03610 |
| 10.72304 | -7.57275 | 97.96616 | -10.18412 | 195.20000 | .07470 |
| 11.44608 | -7.77138 | 99.96350 | -9.91420 | 195.60000 | -.11400 |
| 12.16912 | -7.95806 | 101.95984 | -9.62900 | 196.00000 | -.15400 |
| 12.89216 | -8.13296 | 103.95608 | -9.33168 | 196.40000 | -.19580 |
| 13.61520 | -8.29620 | 105.95232 | -9.02219 | 196.80000 | -.23800 |
| 14.41496 | -8.47042 | 107.94856 | -8.70051 | 197.20000 | -.28060 |
| 15.21472 | -8.63765 | 109.94480 | -8.36660 | 197.60000 | -.32360 |
| 16.01448 | -8.79793 | 111.93916 | -8.02541 | 198.00000 | -.36700 |
| 16.81424 | -8.95130 | 113.93352 | -7.67326 | 198.40000 | -.40960 |
| 17.61400 | -9.09780 | 115.92788 | -7.31014 | 198.80000 | -.45220 |
| 18.33248 | -9.23005 | 117.92224 | -6.93599 | 199.20000 | -.49480 |
| 19.05096 | -9.35908 | 119.91650 | -6.55080 | 199.60000 | -.53740 |
|  |  | 121.79020 | -6.15913 | 200.00000 | -.58000 |

SUPERCRITICAL AIR-FOIL PROFILE

BACKGROUND OF THE INVENTION

The present invention relates to a supercritical air-foil, particularly a wing profile for an aircraft, or a related type air-foil having a specific design Mach number not exceeding about 0.85 and having a maximum thickness, in units of chord length of $d/l = 0.13 \pm 20\%$.

Supercritical wing profiles are known in a variety of profile contours and shapes resulting accordingly in different pressure distributions along upper and lower surfaces of the air-foil. Basically, two lines of development have resulted here, one of which is represented by German printed patent application No. 2,254,888 (and also U.S. Pat. No. 3,952,971). The profiles as disclosed in this patent develop approximately constant pressure along the upper surface because the supersonic speed zone along the upper surface covers a rather large portion of the profile depth. These profiles have also be termed rooftop profiles; they do indeed produce an increase in lift but they have the disadvantage of an increasing drag resistance of the profile due to the rather abrupt pressure increase in more rearwardly located areas of the profile. Moreover, it was found that these particular profiles, being optimized for a particular design case, exhibit significant disadvantages and drawbacks for off-design operating conditions. For example, these profiles have the tendency that for lower than the design Mach number two shocks are produced which increase the drag resistance significantly. On the other hand, in the case of an increase in the Mach number, at which the profile is operated, the supersonic speed zone is bounded in the rear portion of the profile by shock which becomes rapidly stronger with an increases in speed and leads directly to an increase in resistance and to an increase in the pressure gradient, which in turn endangers increasingly the boundary layers as far as its separation is concerned due to the shockwave that is produced.

The second line of development is particularly derivable from the two German printed patent applications Nos. 2,608,414 and 2,626,279 (see also U.S. Pat. No. 4,072,282). The profiles disclosed in these patents are also known as the Peaky profiles. The pressure distribution for these profiles is particularly characterized by a suction peak in the nose region and have, therefore, rather favorable resistance values for the design parameters. On the other hand, this particular type of profile has a drawback in that the pressure distribution is rather sensitive to changes in the angle of attack as well as to changes in the Mach number. The rear boundary of the supersonic zone sonic line terminates in these off-design operating cases in a rather rapidly increasing shock at shifting positions. The minimum lift as produced is prematurely limited in that the rather rapid increase in resistance introduces a non-linear lift moment which is the result of a shock-induced boundary layer separation. Therefore, an aircraft having such a wing experiences significant changes in pitching moment if the speed deviates significantly from the design speed and/or if the angle of attack deviates from the design value. Accordingly, the manouverability of such a craft suffers due to the sensitivity of the flight parameters to these external interferences and changes in operating conditions. For lower speeds the Peaky profile is endangered as far as lift is concerned by laminar nose separation.

DESCRIPTION OF THE INVENTION

It is an object of the present invention to avoid the drawbacks of the air-foil profiles outlined above and to proide a new and improved air-foil profile which combines the advantages of the two known profile types. Therefore, it is a particular object of the present invention to retain the favorable drag resistance characteristics of the Peaky profile and to combine this advantage with the rather favorable lift properties of the rooftop type profile.

It is another project of the present invention to provide a profile which is to a lesser extent limited by the design parameters but whose behavior under off-design conditions still results in favorable performance.

It is a specific object of the present invention to provide a low drag resistance, high lift producing profile which will not produce shocks, or only insignificant ones over a large range of Mach numbers and for a large range of different angles of attack. Moreover, in the case of a still increasing Mach number, the inevitably occuring shock should be stabilized in its position in a particular range of the profile depth.

In accordance with the prefered embodiment of the present invention, it is therefore suggested to provide an air-foil profile in which the maximum upper surface thickness is located at a distance of $0.42 \pm 10\%$ (in units of chord length) from the leading edge of the profile; the corresponding location of the maximum thickness of the lower side is located at a point spaced from the leading edge by 0.3 (in units of chord length) $+25\%$, $-10\%$. The curvature defined as the inverse value of the radius of curvature of the upper surface is between 0.3 and 0.4 for a profile depth from 0.3 to 0.55; the curvature of the upper surface is below 0.4 for profile depth from 0.55 to 0.7; for a profile depth of about 0.9 the curvature of the upper side should be approximately 0.2 and at a profile depth within the range from 0.5 to 0.6, the curvature has a point of inflection. Preferably, the curvature of the lower surface is larger than the curvature of the upper surface for chord with distances or profile depth from the leading edge up to about 0.55. The curvature changes sign at about 0.6 to 0.7 profile depth, increases to a maximum of about 1.3 and drops to zero at the trailing edge.

An air-foil having these features produces a pressure distribution having a rather significantly pronounced suction range in the front portion of the profile which drops continuously i.e. shock free for the rated design case and at a relatively small pressure gradient towards the trailing end of the profile. In off-design operating ranges, such as changes in the angle of attack, shocks do occur on the upper surface of the profile for rather large angles of attack. However, these shocks are localized and stabilized in a very narrow range as far as profile depth is concerned. Accordingly, undesired changes in moment are avoided, and the performance of the craft remains favorable. An increase in Mach numbers will also result in shocks on the upper surface, but again, they are limited to a very narrow range as far as profile depth is concerned and do not produce significant changes in moment. This particular way of stabilizing the shock producing range rather far in front of the trailing edge avoids separation of the flow rearward from the shock; this is true for a wide range of angles of attack and for a wide range of Mach numbers. The inventive profile has favorable drag resistance coefficients at favorable lift coefficients, favorable off-design properties and favorable performance characteristics which render it particularly applicable to modern commercial aircrafts.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 18 is a table defining the coordinate values of the upper surface of a true profile; and FIG. 19 is a similar table for the lower surface of such a profile.

Proceding now to the detailed description of the drawing, FIG. 1 shows the shape of the air-foil profile in accordance with the prefered embodiment of the invention. The contour is plotted in a relation to a superimposed coordinate system, x/l and z/l, wherein l is the chord length and the chord line is situated on the abscissa. Thus, the relative profile depth has been plotted along the abscissa, and the relative profile thickness z/l has been plotted along the ordinate of the coordinate system. Thickness values are therefore distinguished for the upper and the lower surface, the dividing line being the chord line. All depth values for the profile are taken from the leading edge which is the zero point for the x/l values.

This particular profile has certain features which are similar to features of known air-foil profiles. Such features are, a rather flat upper surface and a lesser flat lower surface having a concavely shaped portion more to the rear of the profile. It should be emphasized that FIG. 1 as well as other Figures are, in fact, drawn to scale, but the decisive criteria and critical elements of the shape in accordance with the invention are very difficult to be drawn and are, therefore, not well recognizable. The criterias outlined above and being responsible for the desired pressure distribution can be deduced from the additional figures. The tables of FIGS. 18 and 19 define the contour of such a profile and by direct x and z values.

Figure 1:
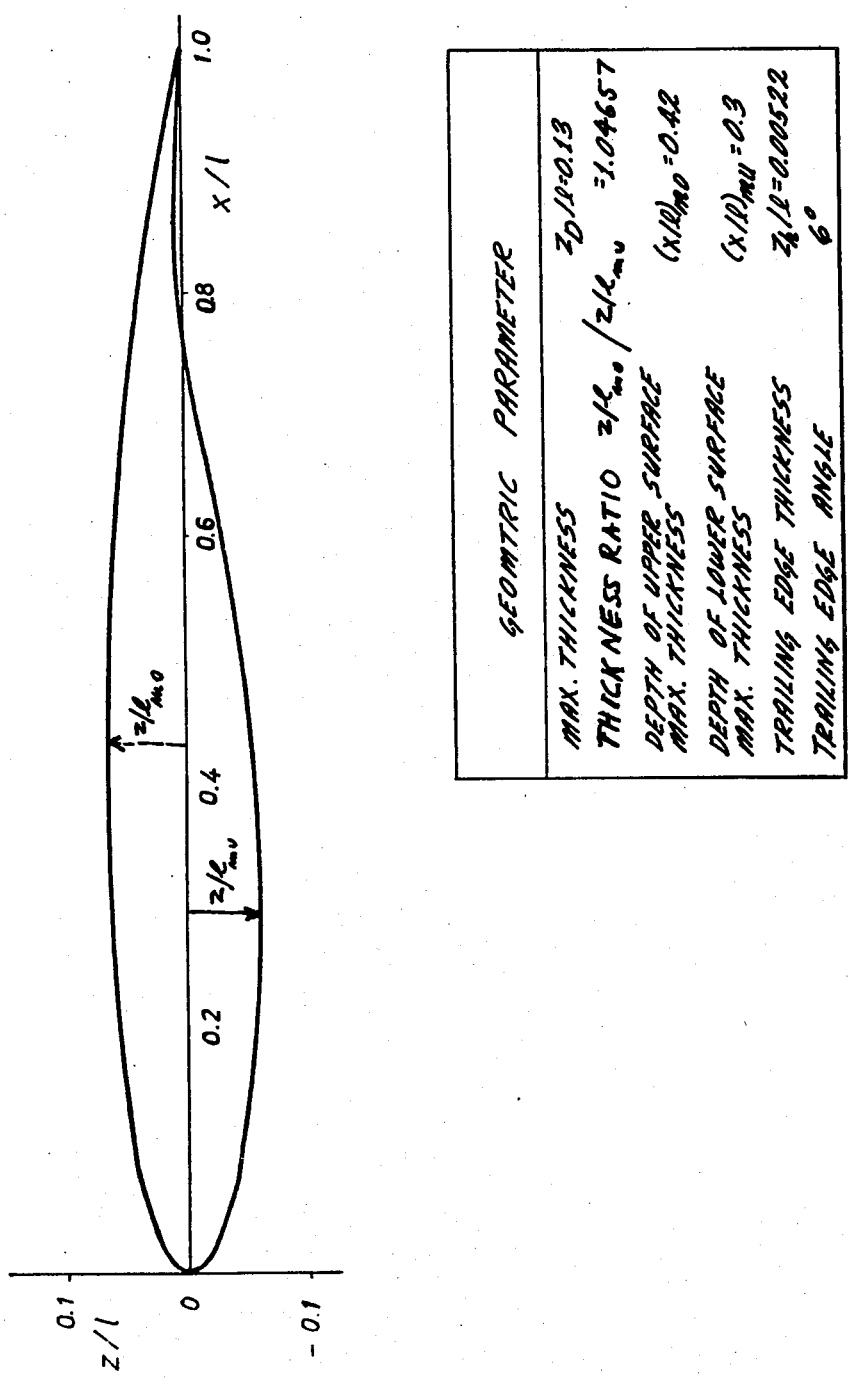
FIG. 1 is a view of the basic shape of a transsonic air-foil profile in accordance with the prefered embodiment of the present invention.
Figure 2:
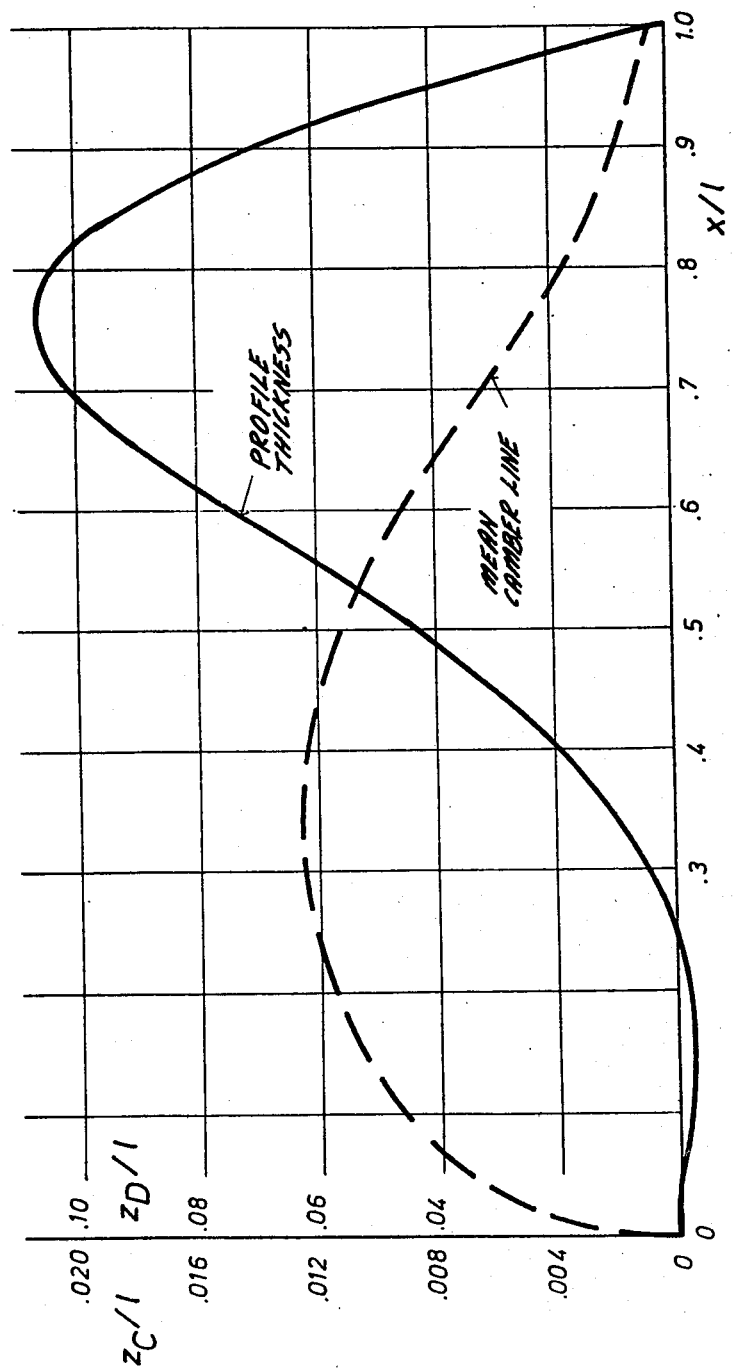
FIG. 2 is a graph demonstrating the thickness of the profile and the mean chamber line thereof.

Turning now to FIG. 2, two diagrams are plotted here, the dash-dash line depicts profile thickness $Z_D/l$ against the relative profile depth x/l, resulting in a so called dropshaped contour. One can see from this particular dashed curve that the maximum thickness of the profile is located between 0.3 and 0.4 of the relative profile depth x/l taken from the front. This particular dimension and contour has to be differentiated on one hand from the rearward position of the maximum thickness of the upper surface and from the corresponding disposition of the maximum thickness of the lower surface. As stated above, the thickness of the upper surface and the thickness of the lower surface are z/l values and distances of surface points from the chord line. The maximum thickness values and their locations are shown in the box underneath FIG. 1. Accordingly, the maximum thickness of the upper portion of the wing is located at a relative chord distance $(x/l)_{mo}=0.42$ while the maximum thickness of the underside is located at $(x/l)_{mu}=0.3$. The mean chamber line also plotted in FIG. 2 being the center line between upper and lower surface profile contours and runs, therefore, in parts a little below the abscissa axis including particularly the nose portion.

Decisive for the pressure distribution along upper and lower surfaces of the profile is the curvature distribution of upper and lower surfaces. This curvature distribution is plotted in FIG. 3 whereby in particular "curvature" is defined as the inverse of the radius of curvature in any point along the upper and lower surface and in a plane that includes a chord line in full.

Figure 3:
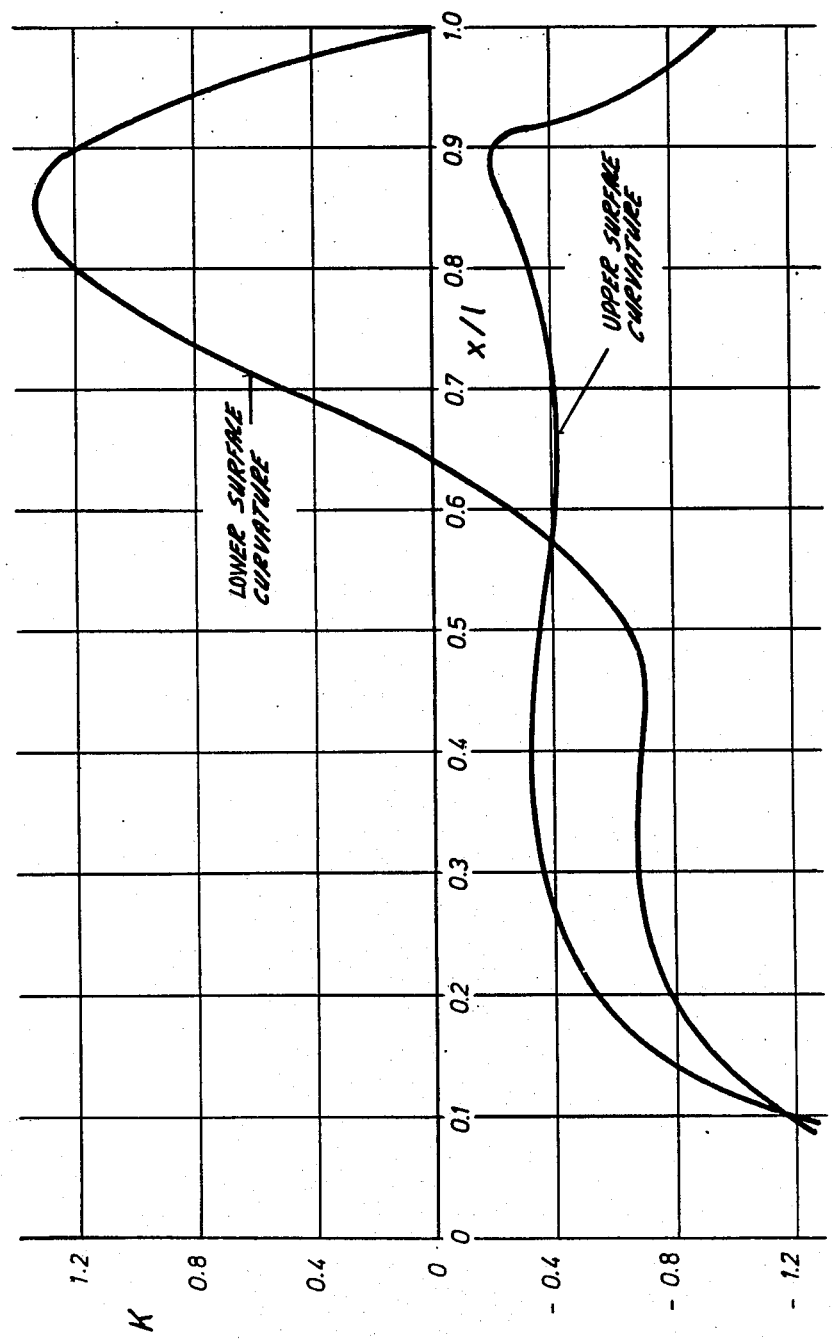
FIG. 3 is a graph showing the distribution of curvature of the upper and lower surfaces of the air-foil shown in FIG. 1.

The curves in FIG. 3 are plotted to scale and they show that the upper side is, in fact, exclusively concavely shaped as far as the geometry in the particular coordinate system of FIG. 1 is concerned. In reality, of course, the profile is convex throughout the upper surface and most of the lower surface. The curvature is particularly characterized by two curvature minima (in absolute values), one being in about 40% relative profile depth and another minimum of curvature is located at about 90% of the relative profile depth. One can also say that these two curvature minimums of the upper profile surface are at 0.4 and 0.9 chord stations from the leading edge. In between these two minima is located a curvature maximum at about 65% profile depth, i.e. a 0.65 chord station from the leading edge. Within the definition given above, the first minimum at the 0.4 depth or chord section has a value of about 0.3, the maximum in between at the 0.65 chord station is about 0.4, and the second minimum at the 90% depth point or 0.9 chord station is about 0.2, all curvature values as absolute values.

The radius of curvature of the upper surface is therefore not constant for a significant range of depth values and chord stations as is the case in the prior art profiles; in fact, the radius of curvature of the novel profile's surface varies continuously. Beginning with the small nose or leading edge radius (large curvature) the curvature reduces steadily to the minimum at the 0.4 chord station, increases again slightly to a rather shallow maximum at about the 0.65 chord station from which maximum the curvature decreases and about the 90% point or 0.9 chord station the profile has actually an absolute minimum i.e. it is the flattest. In addition the curvature changes direction (point of inversion) at about 55% profile depth; the location of this point is of great significance as far as the design pressure distribution and the shock location stabilization is concerned.

As far as the curvature of the lower surface is concerned, up to about 55% relative depth the curvature is almost consistently larger (absolute) than on the upper surface. Behind the 0.55 chord station the curvature reduces below corresponding values (absolute) on the upper surface (i.e. the lower surface is flatter here). At about 64% depth the curvature is 0 and reverses, that is to say, beyond a 0.64 chord station the lower surface becomes actually concave whereas it was convex for about two thirds back from the leading edge. However, it should be mentioned that the passage through zero of the curvature is not a point of inversion of the function $K=f(x/l)$ in the mathematical sense but one usually designates this zero point as a curvature change point because the contour proper changes here from convex to concave. Beyond this zero crossing the curvature reaches a maximum of about 1.3, at about 85% depth and the curvature drops to zero at the trailing edge.

Figure 4:
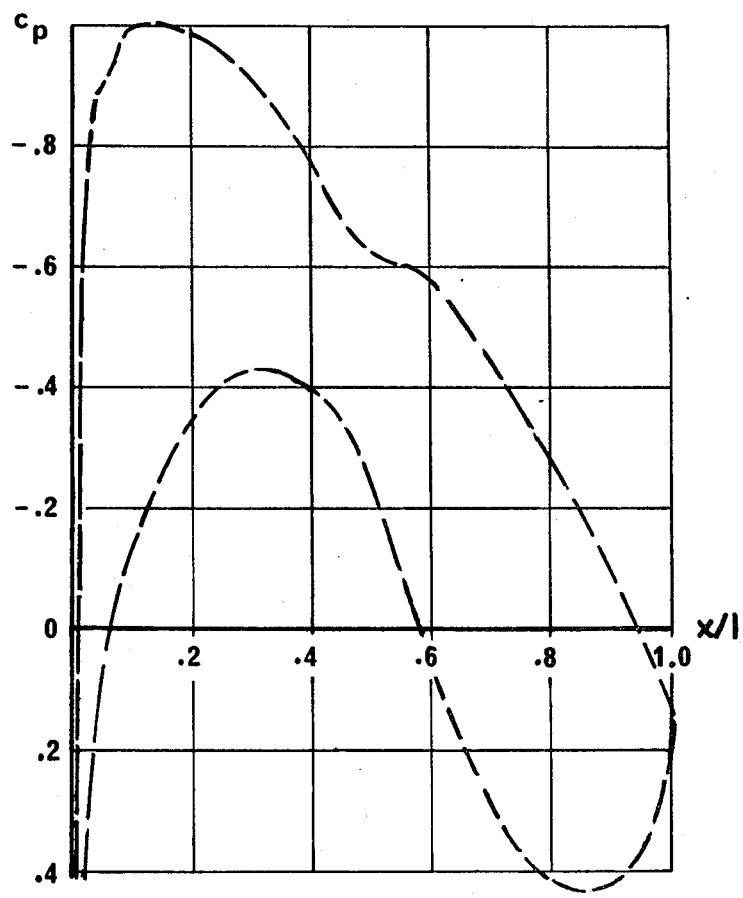
FIG. 4 is a graph showing the design pressure distribution.

After having described the relevant parameters of the profile we now turn to FIG. 4 showing the pressure distribution as it results directly from the curvature as described under consideration of additional aerodynamic parameters. This pressure distribution is plotted for a design case, i.e. a design Mach number of 0.75 which is a normal cruising speed. In accordance with this diagram the under pressure drops rapidly in the leading edge portion and remains approximately constant in the range from about 20 to 30% depth from the leading edge while dropping continuously towards the trailing edge. This particular, continuously shock-free rise in pressure is very favorable as far as the boundry layer is concerned because it avoids boundary layer separation which, of course, would constitute a loss in lift and an increase in drag resistance. The lower surface likewise experiences a rapid rise in underpressure in the more forward portion of the profile, reaching a maximum at the depth of about 30%, dropping to zero at about 60% and resulting in an excess pressure along the underside, from the 0.6 chord station back to the trailing edge and particularly in accordance with the concave contour of the profile. The pressure remains consistently higher on the lower surface than along the upper surface.

The FIGS. 5 through 12 show characteristics and measuring results of the invention profile, particularly for so called off-design conditions i.e. for cases in which the plane does not move in accordance with the design Mach number and/or does not operate at the design angle of attack. Each of the figures and graphs is accompanied by a box identifying curve symbols and associating them with the relative parameters. Herein $M\infty$ denotes the Mach design number; $\alpha$ is the angle of attack in degrees, Ca is the effective lift coefficient, $C_w$ is the effective drag resistance coefficient, $C_m$ is the pitching moment; and Re is the Reynolds number. The FIGS. 5 through 9, as stated, show how the angle of attack modifies the pressure distribution assuming that the Mach number has the design value of 0.75.

Figure 5:
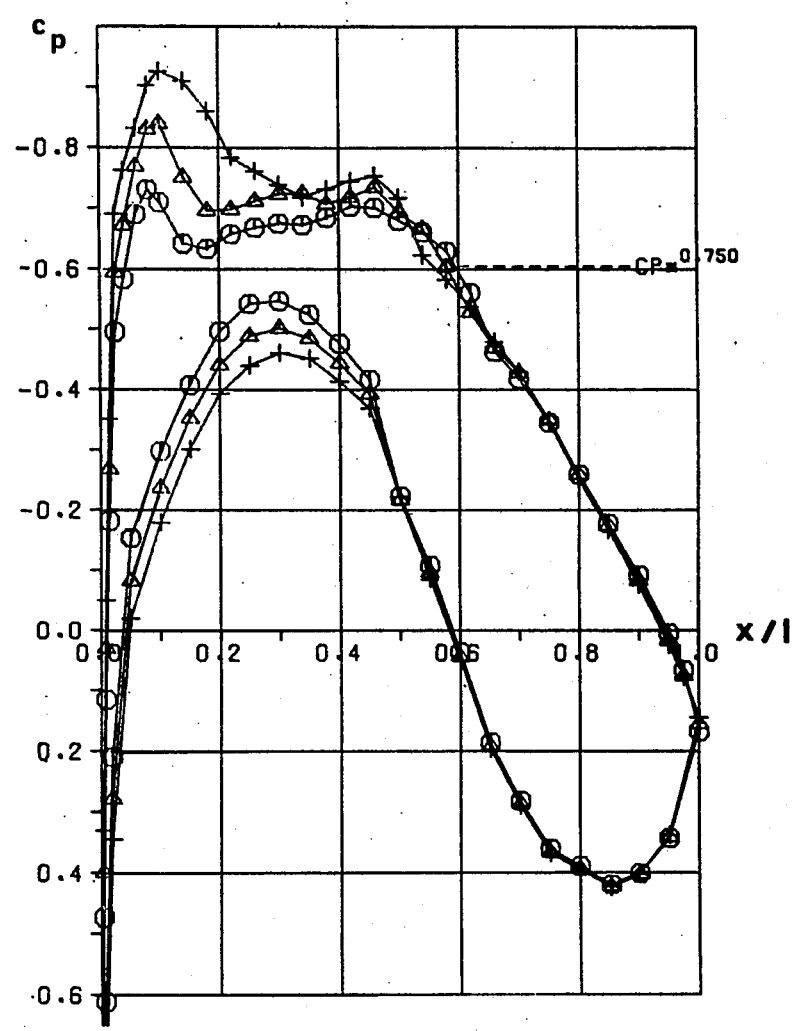
FIGS. 5, 6, 7, 8, 9 and 10 are graphs showing the relationship between pressure distribution and Mach number.

FIG. 5, particularly, shows the pressure distribution for smaller angles of attack, and one can readily see that the pressure distribution differs very little from the pressure distribution of FIG. 4 in which, of course, the air-foil has the rated and design angle of attack. There is, however, a slight dent in the pressure curve in the range between 0.2 and 0.4 chord stations, however, that dent still does not produce any shockwave.

Figure 6:
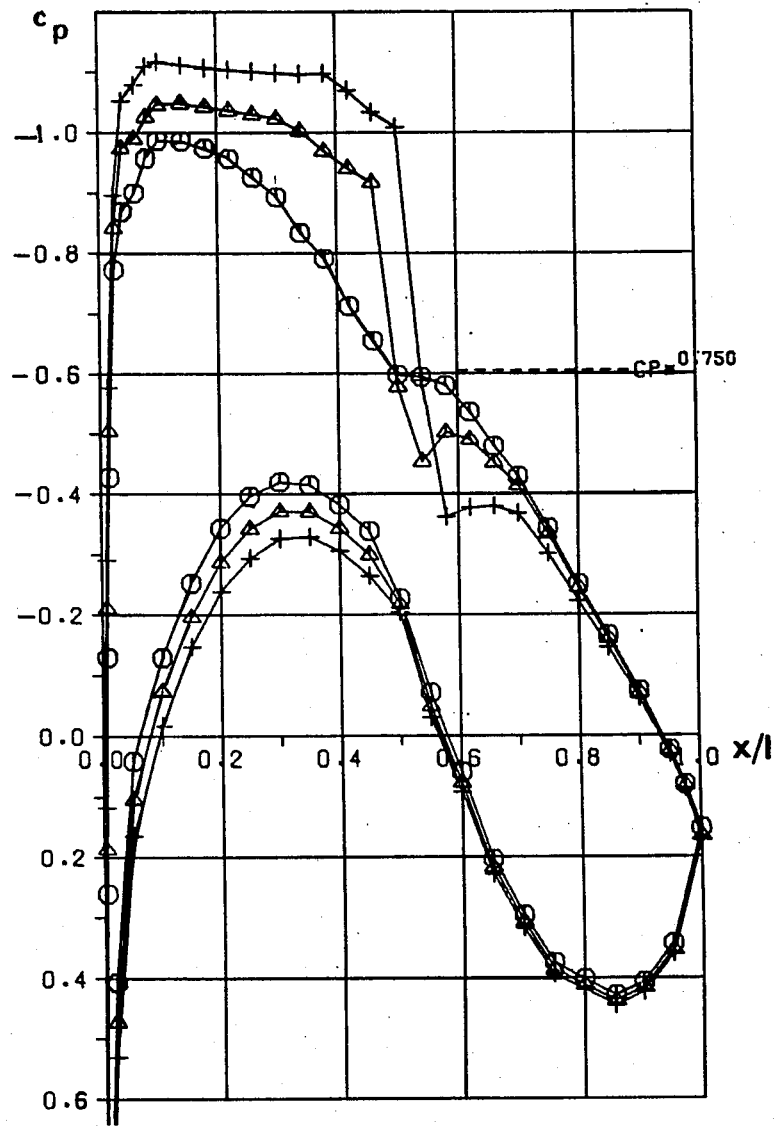
Figure 7:
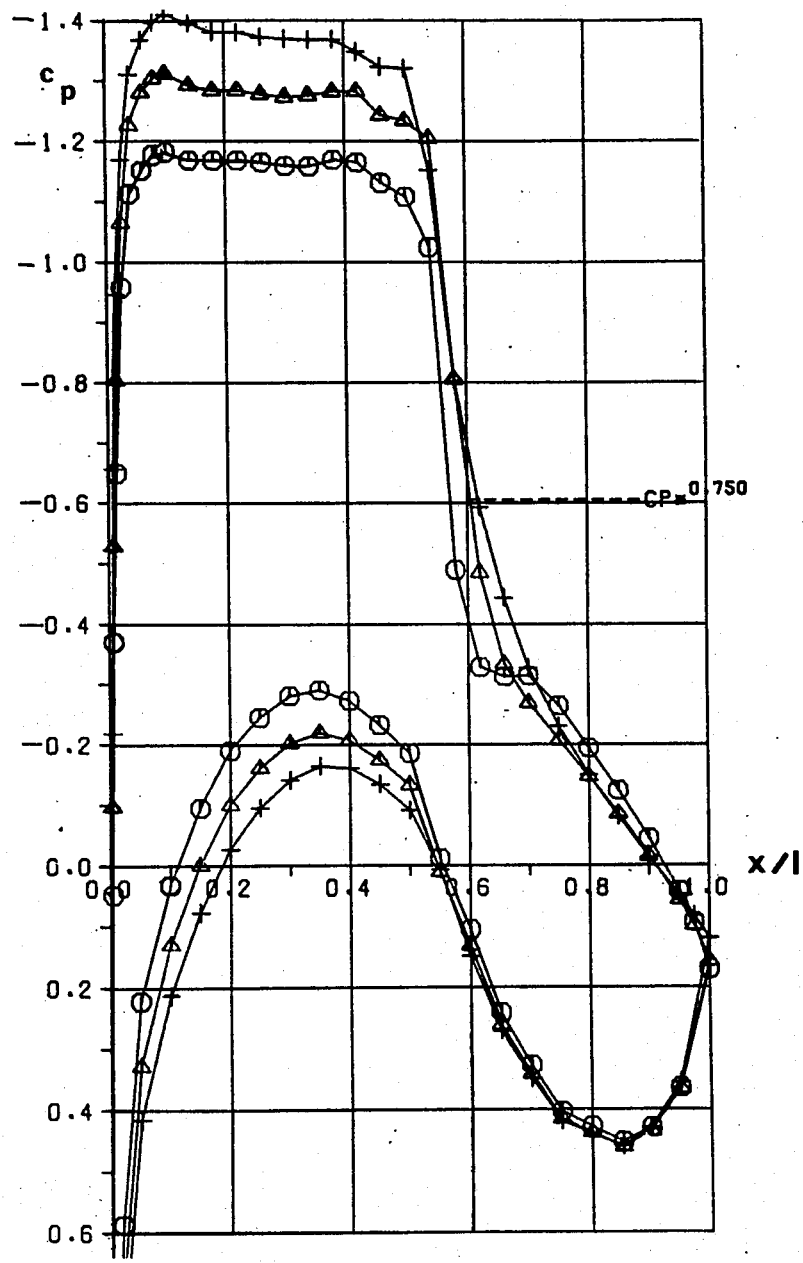

FIG. 6 shows the pressure distribution for larger angles of attack $\alpha$, whereby the supersonic zone is in fact bounded in its rear by a compression shock in the range being developed at a location of the upper surface rearwardly displaced from the leading edge by about 50 to 60% profile depth. These compression shocks for angles of attack from 2.280 and 2.690 are rather closely positioned. FIG. 7 shows the pressure distribution for still larger angles of attack, and one can readily see here that for all of the three different angles of attack the disposition of the compression shocks is narrowed as far as the profile depth is concerned; the shocks are produced in all cases around the 0.6 chord station. This aerodynamic phenomenon is a characteristic feature of the profile in accordance with the invention. Higher angles of attack inevitably produce compression shocks, but they are all localized as far as their position is concerned, in a profile depth range from about 10 to 20% around the 0.6 chord station. This way the shocks are stabilized well in front of the trailing edgs, so that a sufficiently low pressure gradient develops over a rather large depth range, and boundry layer separation and, therefore, premature drag increases and lift-collapse is avoided. Localization of the shock producing portion as well as the avoiding of premature trailing edge separation indeed leads to moment coefficients which vary very little which feature in turn is a very favorable aspect of the profile as far as flight performance is concerned.

Figure 8:
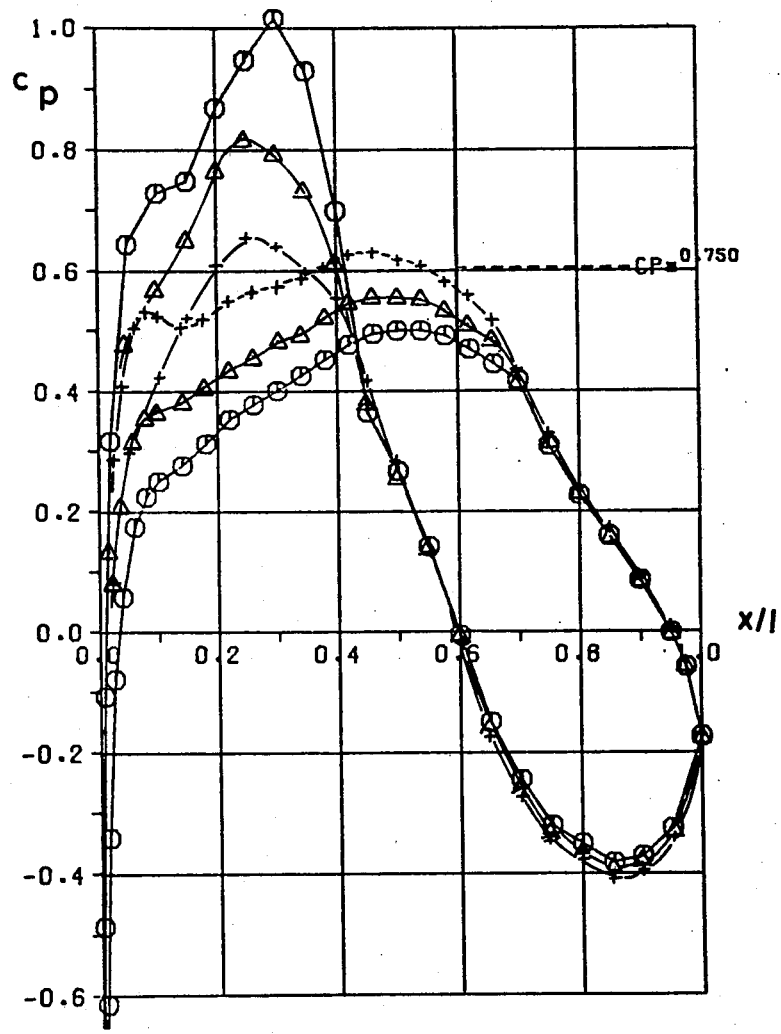

FIG. 8 illustrates the pressure distribution for negative angles of attack; the flow along the underside will become supercritical but remains shock free and does not even separate in the rear portion of strong profile curvature.

Figure 9:
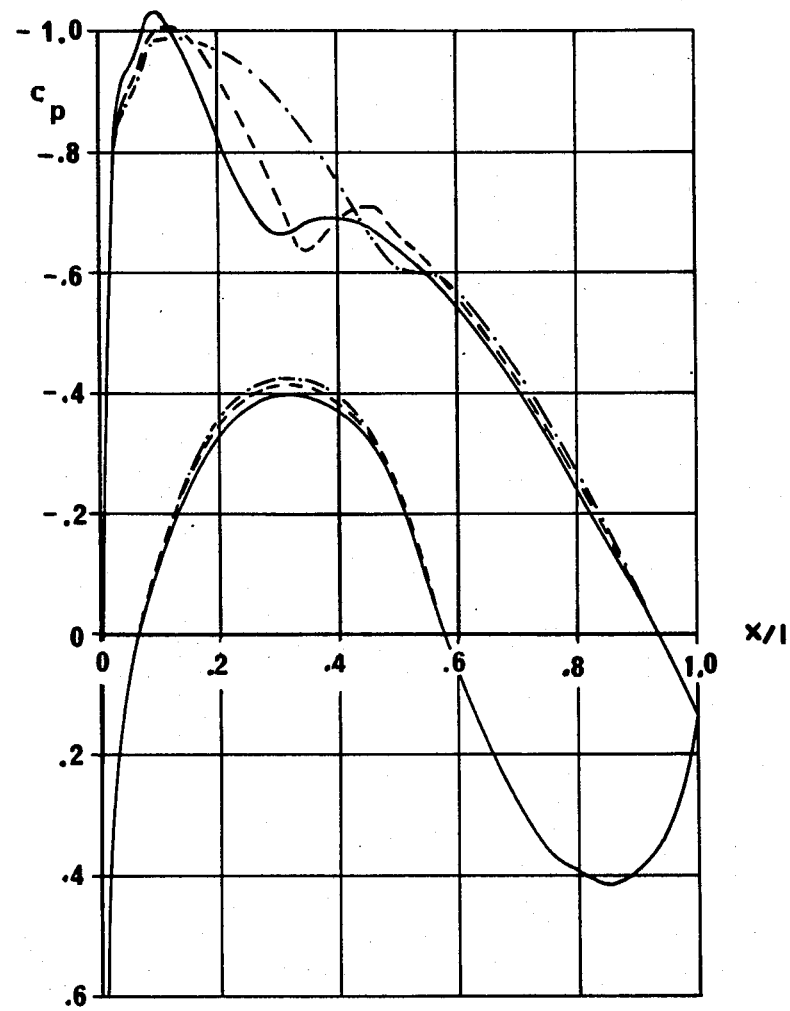
Figure 10:
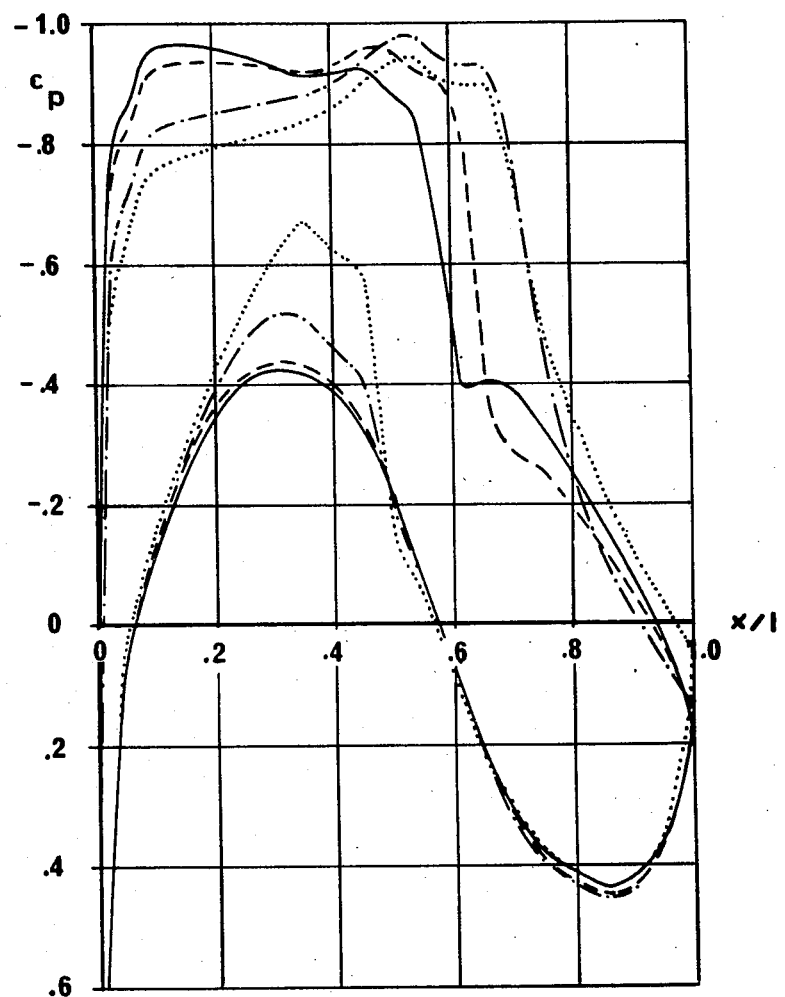

FIGS. 9 and 10 show the relationship between, on the one hand, the design Mach (M75)number and lower, actual Mach numbers, at slightly different angles of attack, and the pressure distribution, on the other hand. FIG. 9 has validity for Mach numbers below the design Mach number and FIG. 10 shows the pressure distribution for larger Mach numbers. For the smaller Mach numbers as per FIG. 9, one will observe a small drop in the pressure followed by a slight increase at about the 0.4 chord station, but that pressure drop is insignificant and will rapidly be "filled" for increasing Mach number so that there will be no shock. In the case of Mach numbers above the design Mach number as shown in FIG. 10, compression shocks are observed on the upper surface in the range between the 0.6 and 0.7 chord station. Again, it can be said that these shocks are stabilized as to their position, i.e. they are limited to a very narrow range on the upper surface of the wing. These measurements have shown also here that the off-design operating conditions of the profile do in fact lead to favorable flight performance.

Figure 11:
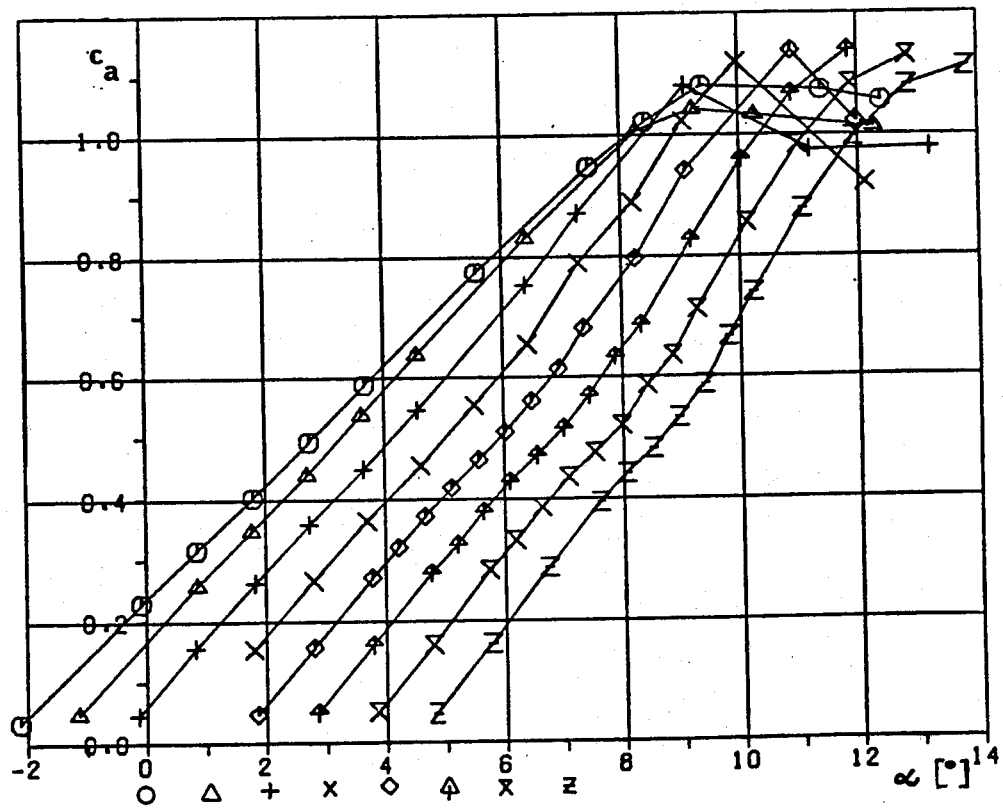
FIGS. 11 and 12 are graphs showing the relationship between angle of attack, Mach number and lift.
Figure 12:
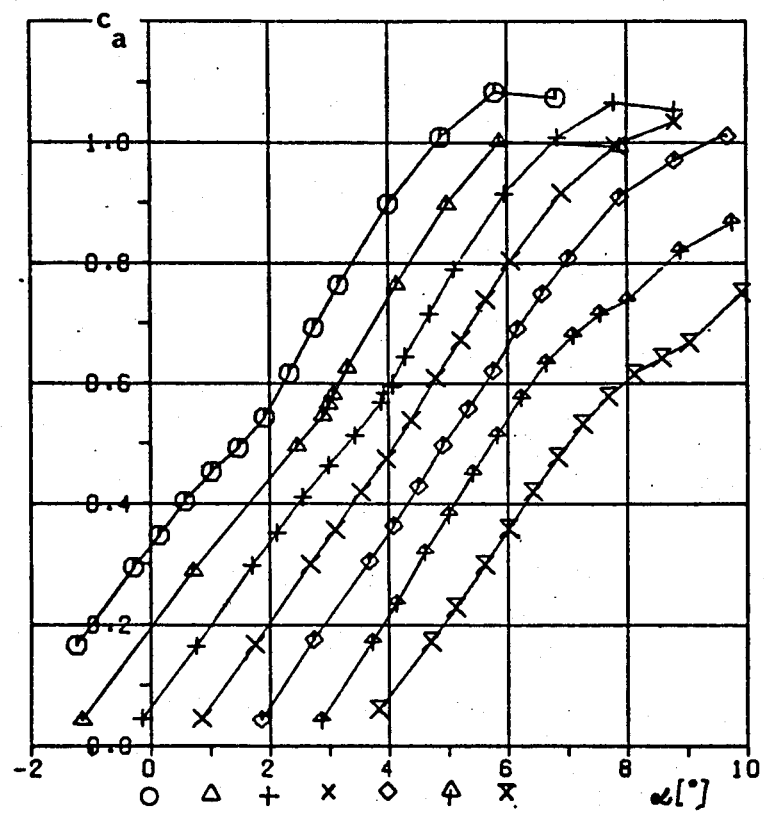

The FIGS. 11 and 12 show the relationship between angle of attack $\alpha$ plotted along the abscissa, Mach number (parameter of the family of curves) and lift, lift coefficient $C_a$. The family of curves shown in FIG. 11 has validity for Mach numbers as a parameter below the design Mach number. FIG. 12 shows a family of curves in which the Mach number parameter is above the design Mach number. Both figures show a rather high maximum lift.

Figure 13:
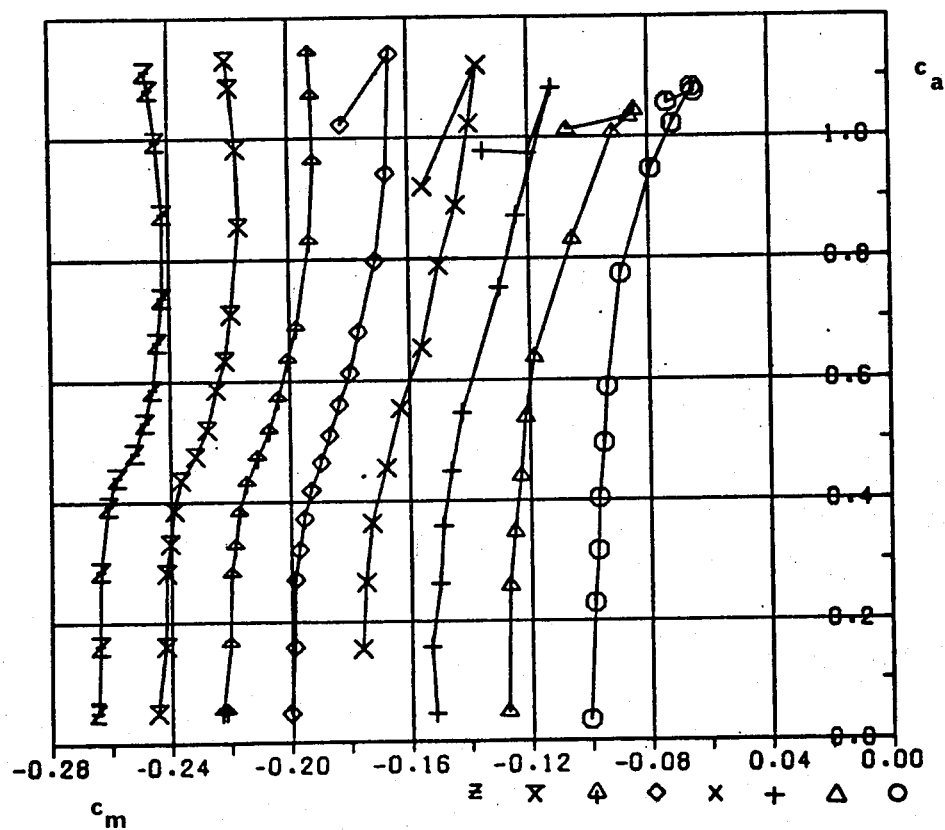
FIGS. 13 and 14 are graphs showing the relationship between angle of attack, Mach number and pitch moment.
Figure 14:
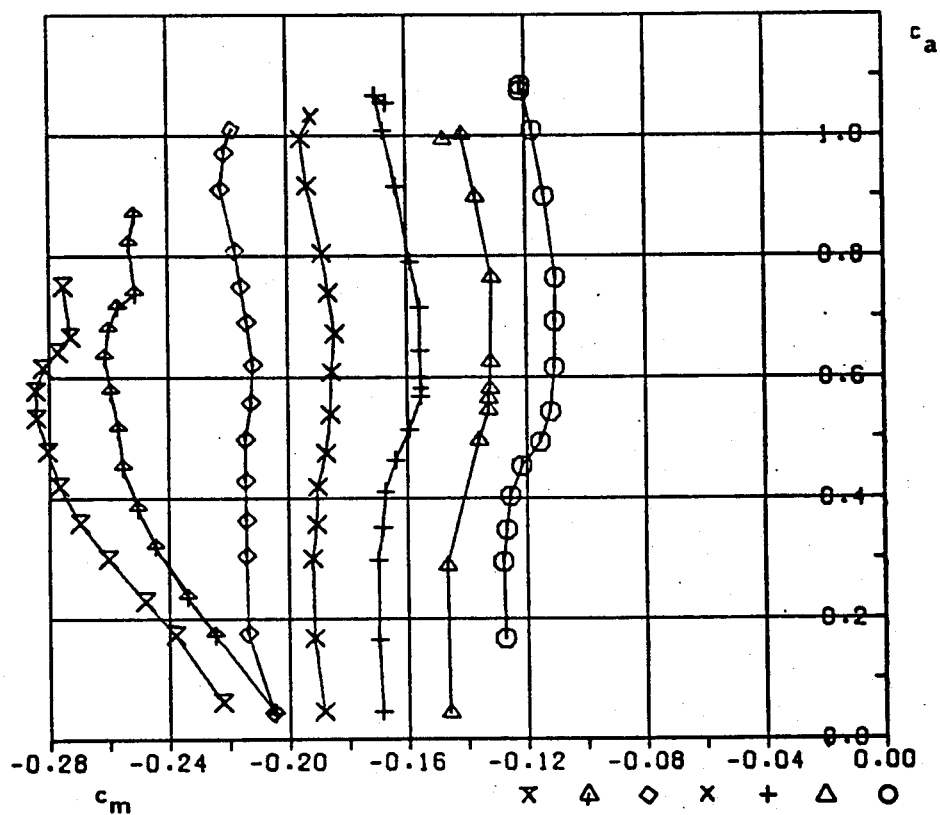

FIGS. 13 and 14 show the relationship between lift coefficient Ca and pitching moment represented here by the coefficient cm. The Mach number is again the parameter for the family of curves. Accordingly, the non-linearity of the moment is rather weakly developed in spite of a rather strong rear profile load also called rear-loading. This holds true for Mach numbers which cover the required off-design range for this particular case and Mach design.

Figure 15:
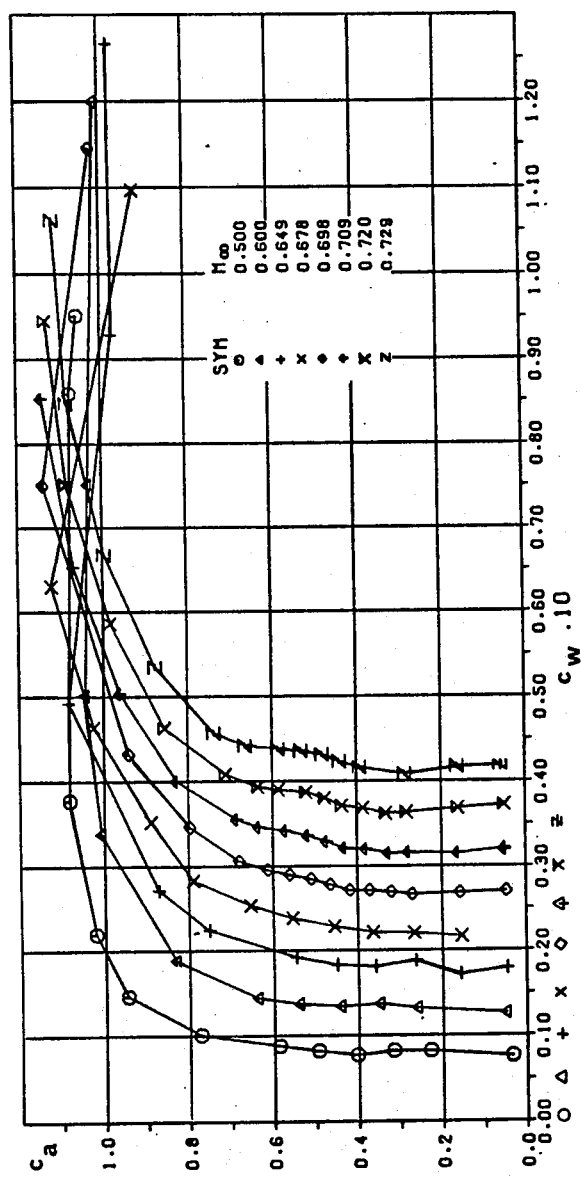
FIGS. 15 and 16 are graphs showing the relationship between angle of attack, Mach number and drag resistance.
Figure 16:
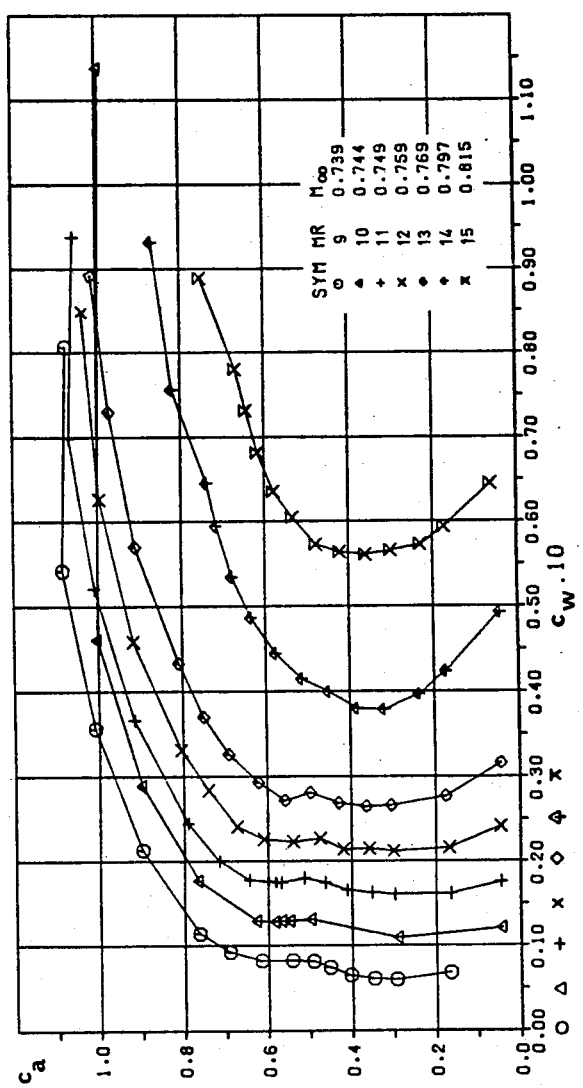
Figure 17:
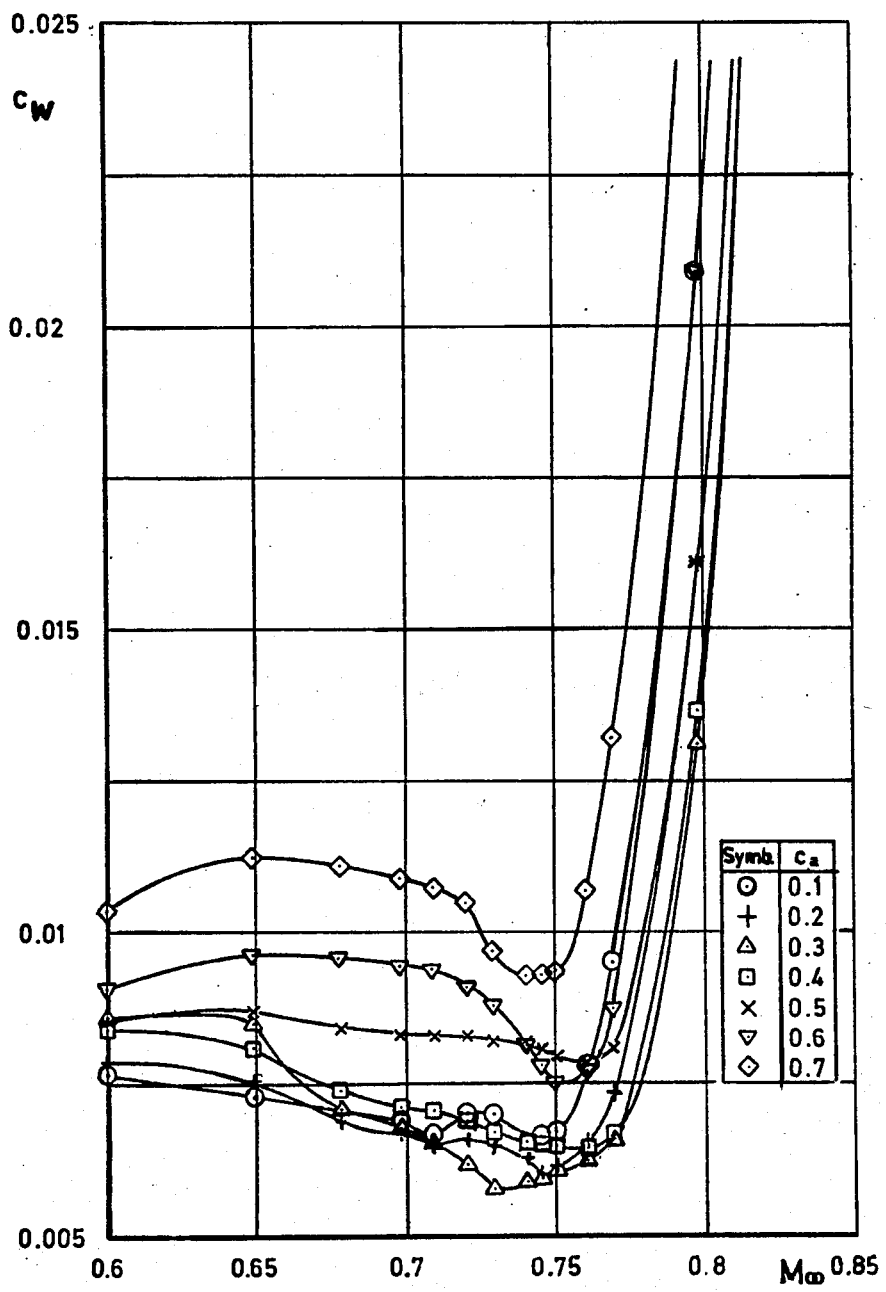
FIG. 17 is a graph showing the relationship between drag resistance in dependence upon the Mach number.

FIGS. 15 and 16 show drag resistance vs. lift in dependency upon the Mach number, whereby again FIG. 15 depicts a family of curves well below design Mach numbers as parameter and FIG. 16 is analogously plotted for above design Mach numbers. Finally, FIG. 17 shows drag coefficient $C_w$ vs. Mach nembers, the lift coefficient $C_a$ being the parameter in this case.

All these curves demonstrate most vividly the effect of the pressure distribution that results from the inventive profile. The range of low profile drag resistances has been considerably expanded consistently with a lack of sensitivity of the pressure distribution to variations in actual Mach number and angle of attack. The pressure distribution is indeed favorable as far as drag resistance is concerned. The resistance level of $cw = 0.01$ will be exceeded only for lift values which are well above the design case.

FIGS. 18 and 19 show respectively table 1 and table 2 in which x values, i.e. true profile depth values are associated with Z or thickness values for a profile, whereby table 1 shows the Z values for an upper surface and table 2 shows the Z values from a lower surface, the chord line being $Z=0$ in either case.

The geometry of the profile in accordance with the invention produces a design pressure distribution which combines a large lift with a low resistance. The advantage of this particular pressure distribution is retained over a considerable range in off-design operating parameters. The particular pressure distribution reacts only very little against external disturbances such as changes in the Mach number, changes in the angle of attack or against local construction deviation such as transition to flaps or elastic deformations of the air-foil. These properties of the inventive profile fullfills the essential requirements for introducing the supercritical wing into the modern aircraft design development and construction.

It can readily be seen that profiles of the type can be used as propellers, rotors, rotor blades in fluid machines or the like. The invention is not limited to the embodiments described above but all changes and modifications thereof not constituting departures from the spirit and scope of the invention are intended to be included.

I claim:

1. An air-foil profile having a specific Mach design number not exceeding about 0.85 and a maximum profile thickness of about $0.13 \pm 20\%$ in units of chord lengths, the profile having in each point a radius of curvature, the profile having separate maximum thicknesses respectively of an upper surface portion and of a lower surface portion relative to a chord line, the maximum thickness of the upper surface portion of the foil is at a $0.42 \pm 10\%$ chord station;

the maximum thickness of the lower surface portion is at an about 0.27 to an about 0.37 chord station;

the surfaces having a curvature definded as the absolute inverse value of the radius of curvature, comprising the following features:

the curvature of the upper surface is between 0.3 and 0.4 for a first minimum in a chord station range from 0.3 to 0.55;

the curvature of the upper surface is about 0.4 for a relative maximum in a chord station range from 0.55 to 0.7;

the curvature of the upper surface profile is about 0.2 for a second minimum at a chord station of about 0.9;

a point of inflection in the curvature is located at a 0.5 to 0.6 chord station between the first minimum and the maximum;

the curvature of the lower surface is larger than the curvature of the upper surface for chord stations smaller than and up to 0.55;

the curvature of the lower surface is zero at a station from 0.6 to 0.7; and the curvature of the lower surface increases rearwardly from a zero value at a change in sign to a maximum of about 1.3 from which the curvature of the lower surface drops to zero at the trailing edge of the profile.

2. An air-foil profile as in claim 1, further characterized by the dimensions for profile ordinate values in units of chord length, the ordinate values being as set forth in tables 1 and 2.

* * * * *